US009239083B2

(12) United States Patent
Koyama et al.

(10) Patent No.: US 9,239,083 B2
(45) Date of Patent: Jan. 19, 2016

(54) UNIVERSAL JOINT AND YOKE

(71) Applicant: JTEKT CORPORATION, Osaka-shi, Osaka (JP)

(72) Inventors: Takeshi Koyama, Neyagawa (JP); Kohei Yamamoto, Settsu (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/377,658

(22) PCT Filed: Feb. 8, 2013

(86) PCT No.: PCT/IB2013/000157
§ 371 (c)(1),
(2) Date: Aug. 8, 2014

(87) PCT Pub. No.: WO2013/117982
PCT Pub. Date: Aug. 15, 2013

(65) Prior Publication Data
US 2014/0364242 A1    Dec. 11, 2014

(30) Foreign Application Priority Data

Feb. 8, 2012  (JP) ................................. 2012-025185

(51) Int. Cl.
*F16D 3/38*   (2006.01)
*F16D 1/08*   (2006.01)

(52) U.S. Cl.
CPC ................ *F16D 3/38* (2013.01); *F16D 1/0864* (2013.01); *F16D 3/387* (2013.01)

(58) Field of Classification Search
CPC .......... F16D 1/0864; F16D 3/38; F16D 3/387
USPC .......... 464/134, 135, 182; 403/235, 236, 354, 403/DIG. 9
See application file for complete search history.

(56) References Cited

U.S. PATENT DOCUMENTS

| 6,835,140 B2* | 12/2004 | Fazio ..................... B60S 3/063 464/134 |
| 8,092,313 B2* | 1/2012 | Shibahiraki .............. B62D 1/16 464/134 |
| 2009/0242315 A1 | 10/2009 | Shibahiraki et al. |

FOREIGN PATENT DOCUMENTS

| DE | 10 2005 001 082 A1 | 6/2006 |
| JP | A-2009-299706 | 12/2009 |

OTHER PUBLICATIONS

International Search Report issued in International Patent Application No. PCT/IB2013/000157 mailed Jun. 26, 2013.
Written Opinion of the International Searching Authority issued in International Patent Application No. PCT/IB2013/000157 mailed Jun. 26, 2013.

* cited by examiner

*Primary Examiner* — Gregory Binda
(74) *Attorney, Agent, or Firm* — Oliff PLC

(57) ABSTRACT

A universal joint includes a pair of yokes and a joint cross. The pair of yokes have mutually identical shapes. Each of the yokes has a proximal portion and a pair of arm portions at which the joint cross is mounted. The proximal portion has an insertion hole for mounting a shaft, a slit formed along the insertion hole and a bolt insertion hole for fastening the slit. A positional relationship between the proximal portion and the pair of arm portions is set such that a line segment that connects the pair of arm portions to each other and an insertion direction in which a bolt is inserted in the bolt insertion hole intersect with each other at 45°. The bolt insertion holes of the pair of yokes coupled by the joint cross face the same side.

2 Claims, 6 Drawing Sheets

UNIVERSAL JOINT AND YOKE

BACKGROUND OF THE INVENTION

1. Field of the Invention

The invention relates to a universal joint that is used in, for example, a steering system of an automobile and a yoke that constitutes the universal joint.

2. Description of Related Art

For example, a steering system of an automobile, which is described in Japanese Patent Application Publication No. 2009-299706 (JP 2009-299706 A), includes a steering wheel, a steering shaft coupled to the steering wheel, an intermediate shaft coupled to the steering shaft, and a steering gear unit coupled to the intermediate shaft. As the steering wheel is steered, the steering torque (the rotational force of the steering wheel) is transmitted to the steering gear unit via the steering shaft and the intermediate shaft sequentially, and the steering gear unit turns wheels on the basis of the steering torque. The steering shaft and the intermediate shaft are generally not aligned along the same straight line. In the steering system described in JP 2009-299706 A, the steering shaft and the intermediate shaft are coupled to each other by a universal joint.

The universal joint includes a yoke coupled to an end portion of the steering shaft, a yoke coupled to an end portion of the intermediate shaft, and a joint cross. Each of the yokes has a proximal portion and a pair of arm portions that extend from an axial distal end periphery of the proximal portion. The proximal portion has a cylindrical shape having an insertion hole through which the end portion of the steering shaft or the end portion of the intermediate shaft is inserted. A slit is formed at one portion in the circumference of the proximal portion, and extends in the axial direction of the proximal portion to split the one portion in the circumference. A pair of flanges are respectively formed integrally at the proximal portion on both sides of the slit. A bolt insertion hole is formed in each of the flanges, and extends in a direction perpendicular to the axial direction of the proximal portion.

In the yoke, when the end portion of the steering shaft or intermediate shaft is inserted through the insertion hole of the proximal portion and then a bolt is assembled into the bolt insertion holes of the flanges, the flanges deform in mutually approaching directions such that the width of the slit is reduced. Accordingly, the insertion hole is narrowed. Therefore, the end portion of the steering shaft or intermediate shaft, which is inserted in the insertion hole, closely contacts the proximal portion, so the yoke and the steering shaft or intermediate shaft are firmly coupled to each other.

A circular hole is formed in each arm portion of the yoke. Among four shaft portions of the joint cross, a pair of the shaft portions arranged along the same straight line are respectively inserted through the circular holes of the arm portions of the steering shaft-side yoke via bearings, and a remaining pair of the shaft portions are respectively inserted through the circular holes of the arm portions of the intermediate shaft-side yoke via bearings. By so doing, the joint cross is rotatably supported by the arm portions of the steering shaft-side yoke and the arm portions of the intermediate shaft-side yoke. Thus, as the steering wheel is steered, steering torque of the steering wheel is initially transmitted to the steering shaft to cause the steering shaft to rotate and is subsequently transmitted from the steering shaft to the intermediate shaft via the joint cross to cause the intermediate shaft to rotate.

In JP 2009-299706 A, there are types of yoke, that is, a type in which bolt insertion holes extend parallel to a direction in which a pair of arm portions face each other (referred to as type 1, and see FIG. 1 of JP 2009-299706 A) and a type in which bolt insertion holes extend perpendicular to a direction in which a pair of arm portions face each other (referred to as type 2, and see FIG. 13 of JP 2009-299706 A). In the case where a pair of yokes in a universal joint are formed of only one of type 1 and type 2, in a finished universal joint, a direction in which bolt insertion holes extend in one of yokes and a direction in which bolt insertion holes extend in the other one of the yokes deviate by 90° and do not coincide with each other. Therefore, in the case where a universal joint is coupled between two shafts, that is, a steering shaft and an intermediate shaft, when the corresponding shafts are inserted through the insertion holes of the yokes and bolts are assembled into the bolt insertion holes of the yokes, the bolt insertion holes of each yoke are not seen from the same side, and the bolt insertion holes of only one of the yokes are seen. Then, it is required to, after the bolt is assembled into the bolt insertion holes of the one of the yokes, shift the universal joint by 90° around its axis as a whole to allow the bolt insertion holes of the other one of the yokes to be seen, and then assemble the bolt into the bolt insertion holes of the other one of the yokes. That is, it is not possible to assemble the bolt into the bolt insertion holes of each yoke at a time, so it is inconvenient.

On the other hand, in the case where a universal joint is formed using a yoke of type 1 and a yoke of type 2 one by one, in a finished universal joint, a direction in which bolt insertion holes extend in one of the yokes and a direction in which bolt insertion holes extend in the other one of the yokes coincide with each other. Therefore, in the case where the universal joint is coupled between two shafts, when the bolt is assembled into the bolt insertion holes of each yoke, the bolt insertion holes of each yoke face the same side, so it is possible to assemble the bolt into the bolt insertion holes of each yoke at a time. However, in this case, it is necessary to prepare yokes of two types, that is, type 1 and type 2, so cost increases in manufacturing and control of yokes.

SUMMARY OF THE INVENTION

The invention provides a universal joint that allows a bolt to be assembled into bolt insertion holes of each yoke at a time while reducing cost, and a yoke that constitutes the universal joint.

A first aspect of the invention relates to a universal joint. The universal joint includes: a pair of yokes; and a joint cross that couples the pair of yokes such that the pair of yokes are relatively displaceable. The pair of yokes have mutually identical shapes. Each of the yokes has a proximal portion and a pair of arm portions. Each of the arm portions extends from the proximal portion and the joint cross is mounted to the arm portions. The proximal portion has an insertion hole for mounting a shaft, a slit formed along the insertion hole and a bolt insertion hole for fastening the slit. A positional relationship between the proximal portion and the pair of arm portions is set such that a line segment that connects the pair of arm portions to each other and an insertion direction in which a bolt is inserted in the bolt insertion hole intersect with each other at 45°. In a state where the pair of yokes are coupled by the joint cross, the bolt insertion holes of the pair of yokes face the same side.

With the universal joint according to the above aspect, the pair of yokes that constitute the universal joint are commonalized, so it is possible to reduce the cost of the universal joint. In addition, in the universal joint, the insertion directions in which the bolts are respectively inserted in the bolt insertion holes of the respective yokes are the same, so it is possible to respectively assemble the bolts to the bolt insertion holes of the respective yokes at a time.

In the above-described universal joint, each yoke may have a rib portion that projects from the proximal portion toward bases of the pair of arm portions.

With the above universal joint, a coupling portion at which the proximal portion is coupled to the pair of arm portions is reinforced by the rib portion in each yoke, so it may be possible to improve the strength of each yoke.

A second aspect of the invention provides a yoke. The yoke includes: a proximal portion; and a pair of arm portions that extend from the proximal portion. The pair of arm portions are used for mounting a joint cross. The proximal portion has an insertion hole for mounting a shaft, a slit formed along the insertion hole and a bolt insertion hole for fastening the slit. A positional relationship between the proximal portion and the pair of arm portions is set such that a line segment that connects the pair of arm portions to each other and an insertion direction in which a bolt is inserted in the bolt insertion hole intersect with each other at 45°.

With the yoke according to the above aspect, when a pair of the yokes are prepared and then a universal joint is formed by coupling the pair of yokes by a joint cross, because the pair of yokes are commonalized, it is possible to reduce the cost of the universal joint. In addition, in a finished universal joint, the insertion directions in which the bolts are respectively inserted in the bolt insertion holes of the respective yokes are the same, so it is possible to respectively assemble the bolts to the bolt insertion holes of the respective yokes at a time.

The above yoke may further include a rib portion that projects from the proximal portion toward bases of the pair of arm portions.

With the above yoke, a coupling portion at which the proximal portion is coupled to the pair of arm portions is reinforced by the rib portion, so it may be possible to improve the strength of the yoke.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
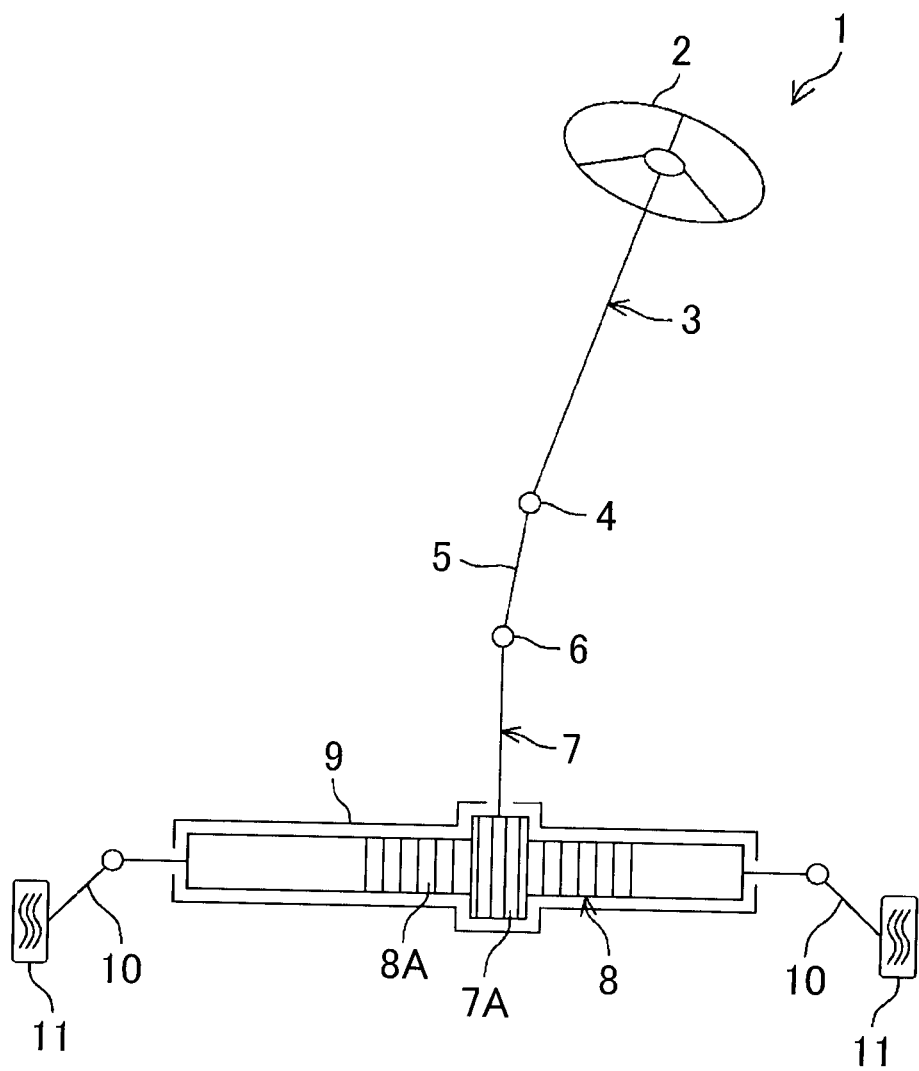
FIG. 1 is a schematic view that shows the schematic configuration of a steering system according to a first embodiment of the invention.

Embodiments of the invention will be described with reference to the accompanying drawings. FIG. 1 is a schematic view that shows the schematic configuration of a steering system 1 according to a first embodiment of the invention. As shown in FIG. 1, the steering system 1 according to the first embodiment mainly includes a steering member 2, a steering shaft 3, a universal joint 4, an intermediate shaft 5, a universal joint 6, a pinion shaft 7, a rack bar 8 and a rack housing 9.

For example, a steering wheel may be used as the steering member 2. One end of the steering shaft 3 is coupled to the steering member 2. The other end of the steering shaft 3 and one end of the intermediate shaft 5 are coupled to each other by the universal joint 4. The other end of the intermediate shaft 5 and one end of the pinion shaft 7 are coupled to each other by the universal joint 6. The steering shaft 3, the intermediate shaft 5 and the pinion shaft 7 are not aligned along the same straight line.

A pinion 7A is integrally formed at the other end of the pinion shaft 7. The rack bar 8 is a rod-shaped member that extends in a vehicle width direction (horizontal direction in FIG. 1). A rack 8A that meshes with the pinion 7A is formed in the rack bar 8, and the pinion shaft 7 and the rack bar 8 constitute a rack-and-pinion mechanism. The rack housing 9 is a hollow member that extends in the vehicle width direction, and is fixed to a vehicle body (not shown). The rack bar 8 is inserted in the rack housing 9, and is supported by the rack housing 9 via bearings, or the like (not shown). In this state, the rack bar 8 is slidable in the vehicle width direction. Both end portions of the rack bar 8 respectively protrude outward from both ends of the rack housing 9, and tie rods 10 are respectively coupled to both end portions of the rack bar 8. Each of the tie rods 10 is coupled to a corresponding one of steered wheels 11 via a knuckle arm (not shown).

Figure 2:
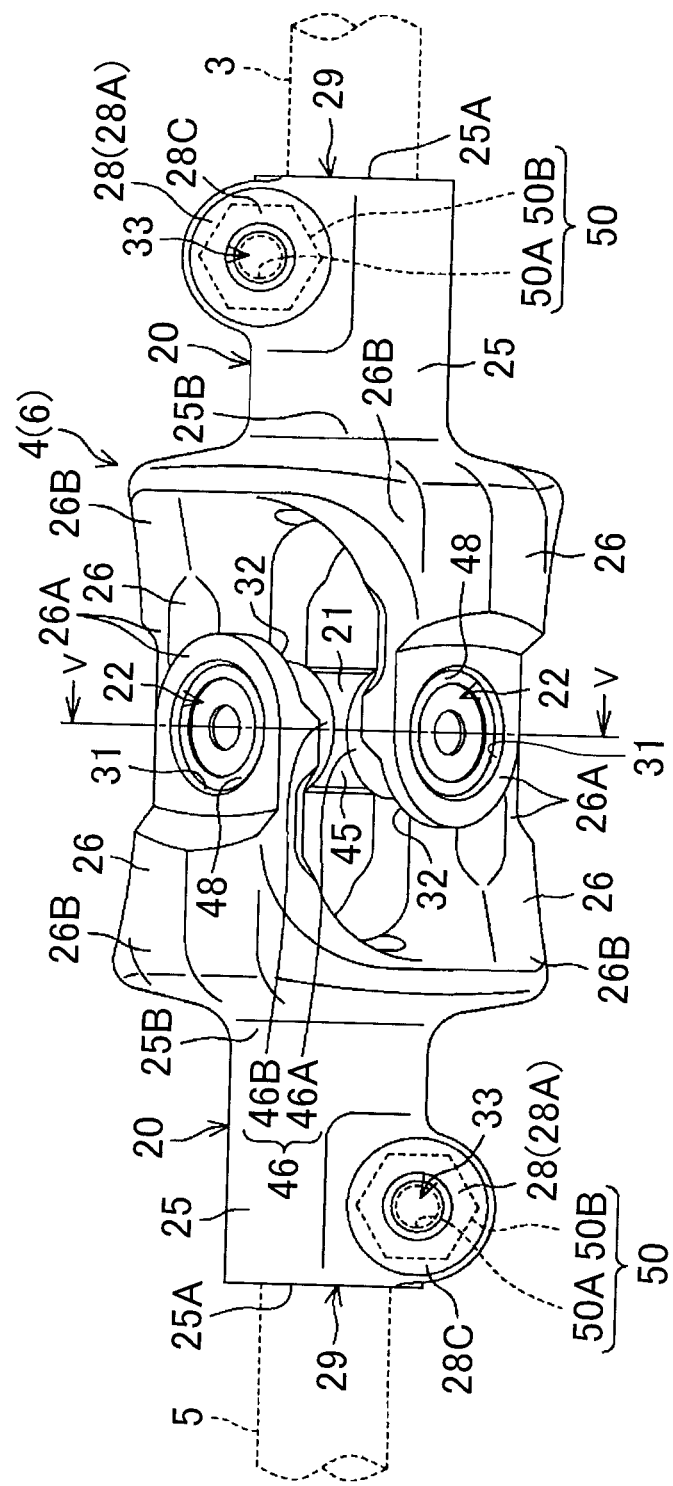
FIG. 2 is a view that shows a universal joint extracted from FIG. 1.

In the thus configured steering system 1, as the steering member 2 is steered and the steering shaft 3 is rotated, the rotation is converted to the sliding motion (linear motion) of the rack bar 8 in the vehicle width direction by the pinion 7A and the rack 8A. By so doing, the steered wheels 11 on both sides of the rack bar 8 are steered. FIG. 2 is a view that shows the universal joint 4 extracted from FIG. 1.

Hereinafter, the universal joint 4 in the steering system 1 will be described in detail. In the first embodiment, the universal joint 4 and the universal joint 6 have the same configuration. As shown in FIG. 2, the universal joint 4 includes a pair of yokes 20, a joint cross 21 and bearing cups 22. Hereinafter, the yokes 20, the joint cross 21 and the bearing cups 22 will be individually described in this order.

Figure 3:
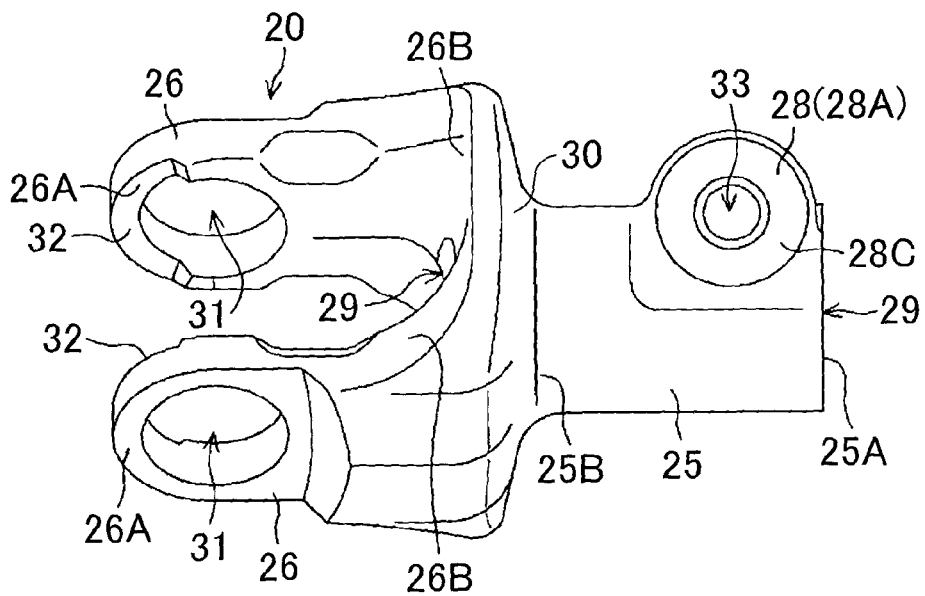
FIG. 3 is a side view of each yoke that constitutes the universal joint.
Figure 4:
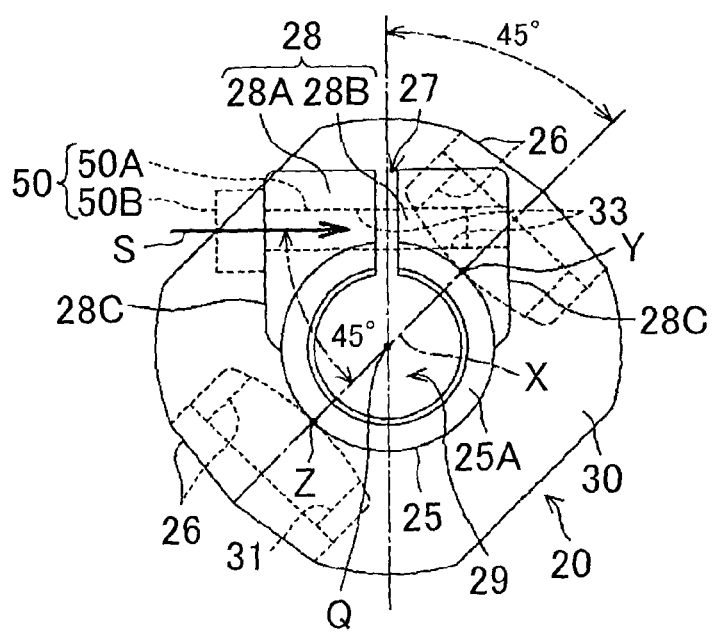
FIG. 4 is a side view of each yoke when viewed in a direction different from that of FIG. 3.
Figure 5:
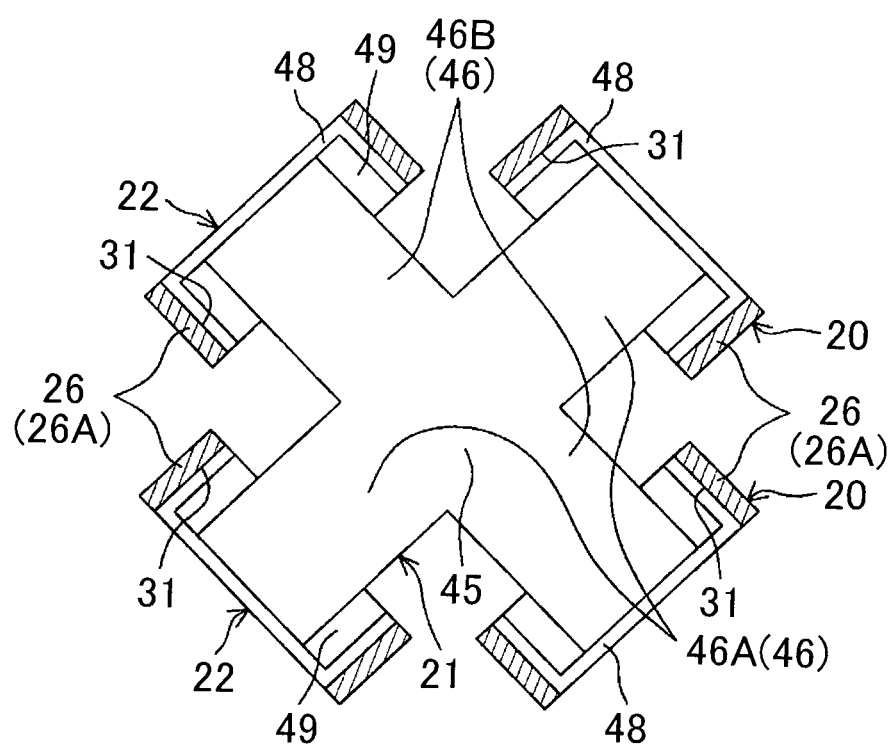
FIG. 5 is a sectional view taken along the line V-V in FIG. 2.

FIG. 3 is a side view of each yoke 20 that constitutes the universal joint 4. FIG. 4 is a side view of each yoke 20 when viewed in a direction different from that of FIG. 3. FIG. 5 is a sectional view taken along the line V-V in FIG. 2. For description of each yoke 20, not only FIG. 2 but also FIG. 3 to FIG. 5 are referenced. The pair of yokes 20 have mutually identical shapes, so only one of the yokes 20 will be described. The yoke 20 is formed by, for example, casting a metal. As shown in FIG. 3 and FIG. 4, the yoke 20 integrally includes a proximal portion 25, a pair of arm portions 26 and a pair of flanges 28.

The proximal portion 25 is a hollow member, and is substantially cylindrical in the first embodiment. As shown in FIG. 3, with reference to a state where the proximal portion 25 is located at the rightmost position in the yoke 20, the right end of the yoke 20 is referred to as one end 25A, and the left end (end portion opposite to the one end 25A) of the yoke 20 is referred to as the other end 25B. An insertion hole 29 is formed in the proximal portion 25 at a position at which the central axis of the proximal portion 25 passes (see FIG. 4). The insertion hole 29 is a circular hole that extends through the proximal portion 25 so as to be exposed at each of the one end 25A and the other end 25B, and constitutes a hollow portion of the proximal portion 25. The central axis (axis) of the circular insertion hole 29 and the central axis of the proximal portion 25 coincide with each other.

A rib portion 30 is integrally formed at the other end 25B of the proximal portion 25. The rib portion 30 projects radially outward from the entire region of the proximal portion 25 in the circumferential direction. The rib portion 30 is a plate having a predetermined thickness. The rib portion 30 is annular when viewed in the axial direction (from any one of the right side and the left side in FIG. 3) of the proximal portion 25) (see FIG. 4). The rib portion 30 is part of the proximal portion 25. Each of the arm portions 26 is a thin plate that is narrow and long in the axial direction of the proximal portion 25, and is integrally formed with the proximal portion 25 (strictly, the rib portion 30). The arm portions 26 are provided one by one at positions that are 180° apart from each other in the circumferential direction at the outer peripheral portion of the rib portion 30. The arm portions 26 extend in a direction away from the proximal portion 25 (left side in FIG. 3, and a direction opposite to the one end 25A). Therefore, when a unit of the proximal portion 25, the rib portion 30 and the arm portions 26 (in other words, the whole of the yoke 20) is viewed from the radially outer side of the proximal portion 25, the unit has a substantially U shape. At the other end 25B of the proximal portion 25, the insertion hole 29 is exposed at a position between the arm portions 26 (see FIG. 3).

The arm portions 26 extend parallel to each other, and each have a fitting hole 31 at the same position in the corresponding longitudinal direction. Each fitting hole 31 is a circular hole that extends through the corresponding arm portion 26 in the radial direction of the proximal portion 25, and is formed at a distal end 26A remote from the proximal portion 25 in the arm portion 26. At the distal end 26A of each arm portion 26, a step 32 is formed on a face that faces the counterpart arm portion 26. A portion at which the step 32 is formed is thinner than the other portion in the distal end 26A of each arm portion 26. At the distal end 26A of each arm portion 26, a face (outer face) at an opposite side with respect to the face that faces the counterpart arm portion 26 is flat. In each arm portion 26, a base 26B adjacent to the rib portion 30 is thick so as to rise toward the counterpart arm portion 26. In each arm portion 26, the base 26B is thick in a trapezoidal shape toward the rib portion 30 when viewed in a direction in which the arm portions 26 face each other (direction in which the fitting holes 31 of the respective arm portions 26 overlap with each other).

The above-described rib portion 30 projects from the other end 25B of the proximal portion 25 toward the bases 26B of the arm portions 26. Therefore, the base 26B of each arm portion 26 is reinforced by thickening, and, in addition, a connecting portion at which the proximal portion 25 is connected to the arm portions 26 is reinforced by the rib portion 30, so it is possible to improve the strength of the yoke 20. As shown in FIG. 4, a slit 27 is formed in the proximal portion 25. The slit 27 is formed by cutting one portion in the circumference of the proximal portion 25 from the one end 25A in the axial direction of the proximal portion 25. When viewed in the axial direction of the proximal portion 25 as shown in FIG. 4, the one portion in the circumference is set at a position that is shifted by 45° or 135° along the circumferential direction of the proximal portion 25 from two intersections Y and Z of a line segment X that connects both arm portions 26 via an axial center Q of the proximal portion 25 with the outer peripheral portion of the proximal portion 25. In other words, the one portion in the circumference is set at a position that is shifted by 45° along the circumferential direction of the proximal portion 25 from one of the intersections Y and Z, which is closer to the slit 27 (here, the intersection Y).

The slit 27 extends along the insertion hole 29 (in other words, the central axis of the proximal portion 25), and splits, the one portion in the circumference of the proximal portion 25. Therefore, the slit 27 communicates with the insertion hole 29 in the entire region of the slit 27. The flanges 28 are portions that are necessarily formed at the proximal portion 25 in association with formation of the slit 27. In other words, the flanges 28 are portions on both sides, which face each other via the slit 27 in the proximal portion 25. The flanges 28 are plate portions that extend parallel to each other in the axial direction of the proximal portion 25 and swell in a circular arc shape toward the radially outer side of the proximal portion 25 (also see FIG. 3). Hereinafter, one of the flanges 28 (the front-side flange 28 in FIG. 3, and the left-side flange 28 in FIG. 4) may be referred to as the flange 28A, and the other one may be referred to as the flange 28B, as distinguished from each other. A bolt insertion hole 33 is formed in each flange 28. Each bolt insertion hole 33 extends in a perpendicular direction (horizontal direction in FIG. 4) perpendicular to a direction in which the insertion hole 29 extends (which is the axial direction of the insertion hole 29, and the thickness direction of the sheet in FIG. 4). Furthermore, each bolt insertion hole 33 extends so as to intersect at 45° with respect to the direction in which the arm portions 26 face each other (that is, the above-described line segment X) when viewed in the axial direction of the insertion hole 29 (proximal portion 25). Therefore, when viewed in the axial direction of the insertion hole 29, an insertion direction S in which a bolt (bolt 50, which will be described later) is inserted through the bolt insertion holes 33 of the flanges 28 intersects at 45° with the direction in which the arm portions 26 face each other (the above-described line segment X). The bolt insertion hole 33 of the flange 28A and the bolt insertion hole 33 of the flange 28B coincide with each other when viewed in the direction in which the flanges 28 face each other. A spiral threaded portion (not shown) is formed at only the inner periphery of the bolt insertion hole 33 of the flange 28B. In each of the flanges 28A and 28B, a face 28C at an opposite side with respect to a face that faces the counterpart flange 28 is flat.

Next, the joint cross 21 and the bearing cups 22 will be described with reference to FIG. 5. Portions indicated by hatching in FIG. 5 are the cross sections of the pairs of arm portions 26 of the respective yokes 20. The joint cross 21 integrally includes a center portion 45 and four shaft portions 46 that radially extend from the center portion 45. Each shaft portion 46 has a circular columnar shape. Among the four shaft portions 46, a pair of the shaft portions 46A are arranged along the same straight line, and a remaining pair of the shaft portions 46B are arranged along the same straight line that extends in a direction perpendicular to the shaft portions 46A. Therefore, the four shaft portions 46 form a cross as a whole.

Each bearing cup 22 includes a cup 48 and an annular bearing 49. The cup 48 serves as a cylindrical lid. The bearing 49 is fitted in the cup 48. The bearing 49 may be formed of a plurality of rollers or needles (not shown) that are arranged in an annular shape. The number of the bearing cups 22 is four in total in the universal joint 4 in accordance with the fitting holes 31 of the two arm portions 26 in each of the yokes 20. The procedure of coupling the steering shaft 3 to the intermediate shaft 5 while assembling the thus configured universal joint 4 will be described.

First, the two yokes 20 are prepared, and are arranged in substantially a coaxial manner as shown in FIG. 2 so as to face each other at the respective arm portion 26 sides. As described above, in each of the yokes 20, when viewed in the axial direction of the insertion hole 29, the bolt insertion holes 33 extend so as to intersect at 45° with respect to the direction in which the arm portions 26 face each other (line segment X) (see FIG. 4). Therefore, with reference to the state shown in FIG. 2, in the thus arranged two yokes 20, the orientations of the respective sets of, flanges 28 are opposite in the vertical direction, but the bolt insertion holes 33 of the flanges 28A face the same side (front side of the sheet in FIG. 2). Therefore, as will be described later, in the yokes 20, it is possible to set the insertion directions S, in which bolts 50 are respectively inserted through the respective sets of the bolt insertion holes 33, to the same direction.

Then, in one (here, right-side one) of the yokes 20 in FIG. 2, a jig (not shown) is hooked to the distal ends of the arm portions 26, and a clearance between these arm portions 26 is temporarily increased. At this time, between the shaft portions 46A (see FIG. 5) of the joint cross 21, one of the shaft portions 46 is inserted into the fitting hole 31 of one of the arm portions 26 from between the arm portions 26, and the other one of the shaft portions 46 is inserted into the fitting hole 31 of the other one of the arm portions 26 from between the arm portions 26.

After that, the bearing cups 22 are respectively placed to face the fitting holes 31 of the arm portions 26 from the outer side. At this time, in each bearing cup 22, the bearing 49 (see FIG. 5) exposed from the cup 48 is oriented to face the fitting hole 31. In this state, the bearing cups 22 are brought close to the corresponding fitting holes 31 and are fitted to the corresponding fitting holes 31. The bearing cups 22 are press-fitted to the corresponding fitting holes 31. At this time, the jig (not shown) is hooked to the steps 32 of the arm portions 26, so the arm portions 26 do not bend as the bearing cups 22 are press-fitted.

In a state where the bearing cups 22 have been press-fitted, the corresponding one of the shaft portions 46A is inserted inside the annular portion of the bearing 49 of the bearing cup 22 fitted to each fitting hole 31 (see FIG. 5), and the joint cross 21 is rotatably supported by the arm portions 26 of the right-side yoke 20 in FIG. 2. Subsequently, in the same procedure as that of the right-side yoke 20, a clearance between the arm portions 26 of the left-side yoke 20 is temporarily increased with the use of the jig (not shown). At this time, between the remaining shaft portions 46B of the joint cross 21, one of the shaft portions 46 is inserted into the fitting hole 31 of one of the arm portions 26 from between, the arm portions 26, and the other one of the shaft portions 46 is inserted into the fitting hole 31 of the other one of the arm portions 26 from between the arm portions 26.

Then, the bearing cups 22 are respectively press-fitted into the fitting holes 31 of the arm portions 26. In a state where press-fitting has been completed, the corresponding one of the shaft portions 46B is inserted inside the bearing 49 of the bearing cup 22 fitted in each fitting hole 31, and the joint cross 21 is rotatably supported by the arm portions 26 of the left-side yoke 20. In this manner, the yokes 20 are coupled to each other by the joint cross 21, and the universal joint 4 is finished as shown in FIG. 2. In the finished universal joint 4, the bolt insertion holes 33 of the flanges 28A of the respective yokes 20 still face the same side (the front side of the sheet in FIG. 2).

In this way, it is possible to form the universal joint 4 by combining the two identical (one-type) yokes 20. Therefore, it is possible to reduce the part numbers of the yokes 20 or commonalize a die for manufacturing the yokes 20. By so doing, it is possible to reduce the cost of the universal joint 4. In the finished universal joint 4 as described above, the yokes 20 are coupled to each other by the joint cross 21 so as to be relatively displaceable around the joint cross 21. Therefore, each yoke 20 is able to pivot around the corresponding shaft portions 46 of the joint cross 21.

In the finished universal joint 4, the end portion of one of the steering shaft 3 and the intermediate shaft 5 (here, the steering shaft 3) is inserted and mounted in the insertion hole 29 (see FIG. 4) of the right-side yoke 20 in FIG. 2 from the one end 25A of the proximal portion 25. The inserted steering shaft 3 is coaxial with the insertion hole 29. If serrations (not shown) are formed on the inner periphery that defines the insertion hole 29 of the proximal portion 25 of the yoke 20 and the outer periphery of the steering shaft 3, the proximal portion 25 is fitted to the steering shaft 3, inserted in the insertion hole 29, by serrations.

In a procedure similar to the case of the steering shaft 3, the end portion of the intermediate shaft 5 is inserted and mounted in the insertion hole 29 (see FIG. 4) of the left-side yoke 20 in FIG. 2. The right-side yoke 20 may be appropriately displaced on the steering shaft 3 so that the end portion of the intermediate shaft 5 can be inserted into the insertion hole 29 of the left-side yoke 20. In addition, after the end portion of the intermediate shaft 5 has been inserted in the insertion hole 29, the right and left yokes 20 may be appropriately displaced on the steering shaft 3 or the intermediate shaft 5 so as to be adjusted in position.

The intermediate shaft 5 that has been inserted in the insertion hole 29 of the left-side yoke 20 is coaxial with that insertion hole 29. The proximal portion 25 of the left-side yoke 20, as well as the right-side yoke 20, may be fitted to the intermediate shaft 5, which is inserted in the insertion hole 29, by serrations. Subsequently, the bolt 50 (see FIG. 4) is arranged one by one at the flange 28A side of each of the yokes 20, and the bolt 50 is inserted one by one into the bolt insertion hole 33 of each of the flanges 28A. At this time, because the bolt insertion holes 33 of the flanges 28A in the respective yokes 20 face the same side (the front side of the sheet in FIG. 2), the insertion directions S (see FIG. 4) in which the bolt 50 is inserted in the bolt insertion hole 33 of each yoke 20 are the same. Therefore, in a state where the universal joint 4 is placed in a set position, it is possible to respectively assemble the bolts 50 to the bolt insertion holes 33 of the respective yokes 20 at a time. By so doing, it becomes easy to assemble the universal joint 4, so, accordingly, it is possible to design components around the universal joint 4 in the steering system 1 (see FIG. 1) such that the components have simple configurations.

A threaded portion 50A of the bolt 50 inserted in the bolt insertion hole 33 of the flange 28A of each of the yokes 20 passes across the slit 27 and is screwed into the bolt insertion hole 33 of the flange 28B (see FIG. 4). As shown in FIG. 4, in each yoke 20, as the bolt 50 is screwed in by a certain amount, a head 50B of the bolt 50 contacts the flange 28A, and the threaded portion 50A meshes with the threaded portion (not shown) in the bolt insertion hole 33 of the flange 28B. In this state, as the bolt 50 is further screwed into the bolt insertion hole 33 by a predetermined amount, the flange 28A is pressed against the flange 28B by the head 50B, and the flange 28B is pulled toward the flange 28A by the threaded portion 50A. By so doing, the flange 28A and the flange 28B bend to approach each other, and the slit 27 is fastened (narrowed). In each yoke 20, as the flange 28A and the flange 28B approach each other (the slit 27 is fastened) by assembling the same bolt 50 to the bolt insertion holes 33 of the respective flanges 28, the proximal portion 25 having these flanges 28 reduces in diameter as a whole, so the insertion hole 29 is narrowed. Due to the narrowed insertion hole 29, the proximal portion 25 of the right-side yoke 20 in FIG. 2 closely contacts the steering shaft 3 and the serration-fitting of them is reinforced, and the proximal portion 25 of the left-side yoke 20 closely contacts the intermediate shaft 5 and the serration-fitting of them is reinforced.

Thus, coupling of the steering shaft 3 and the intermediate shaft 5 to the universal joint 4 is completed. It is also applicable that the steering shaft 3 is initially coupled to the right-side yoke 20 and the bolt 50 is assembled to the right-side yoke 20 and then the intermediate shaft 5 is coupled to the left-side yoke 20 and the bolt 50 is assembled to the left-side yoke 20. Different from the yokes 20 according to the first embodiment of the invention, in the yoke of type 1 (see FIG. 1 in JP 2009-299706 A) in which the bolt insertion holes extend parallel to the direction in which the arm portions face each other, when the bolt is fastened to the bolt insertion holes, force that fastens the bolt acts on the arm portions. Thus, the circular holes (corresponding to the fitting holes 31 in the first embodiment) in the respective arm portions deviate from each other, and the coaxiality of these circular holes decreases, so movement of the joint cross may be inhibited. On the other hand, in the yoke of type 2 (see FIG. 13 of JP 2009-299706 A) in which the bolt insertion holes extend in a direction perpendicular to the direction in which the arm portions face each other as well, when the bolt is fastened to the bolt insertion holes, force that fastens the bolt acts on the arm portions. Thus, the circular hole in each arm portion deforms, and the roundness of each circular hole decreases, so movement of the joint cross may be inhibited.

However, in each of the yokes 20 according to the first embodiment of the invention, as shown in FIG. 4, the bolt insertion holes 33 extend so as to intersect at 45° with respect to the direction in which the arm portions 26 face each other (that is, the above-described line segment X). That is, in each of the yokes 20 according to the first embodiment of the invention, when viewed in the axial direction of the proximal portion 25 (insertion hole 29), the positional relationship between the proximal portion 25 and the arm portions 26 are set such that the insertion direction S in which the bolt 50 is inserted in the bolt insertion holes 33 intersects with the line segment X at 45°. In this case, force that fastens the bolt 50 to the bolt insertion holes 33 is hard to act on the arm portions 26, so inconveniences that can occur in the yoke of type 1 and the yoke of type 2 are hard to occur.

Figure 6:
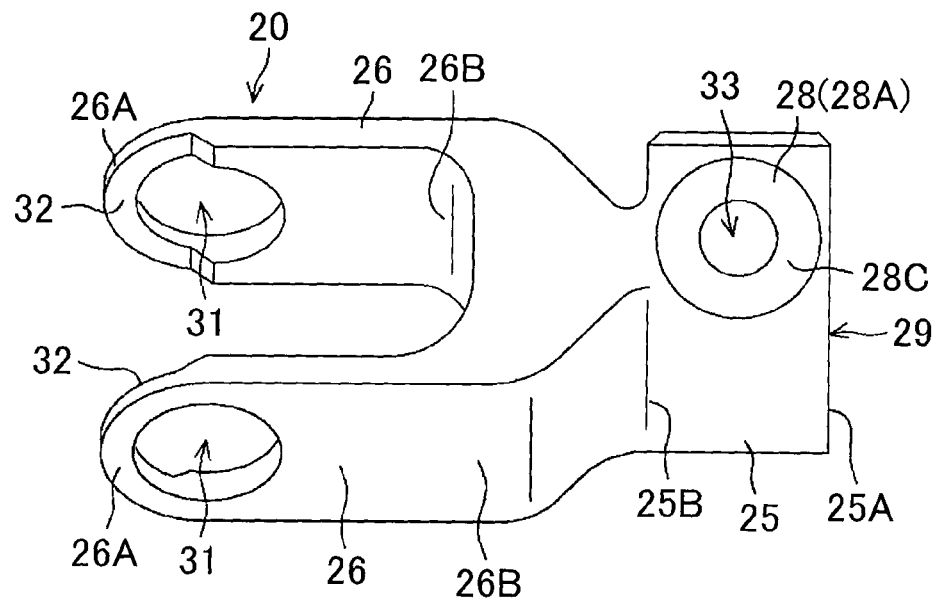
FIG. 6 is a side view of each yoke according to a second embodiment.
Figure 7:
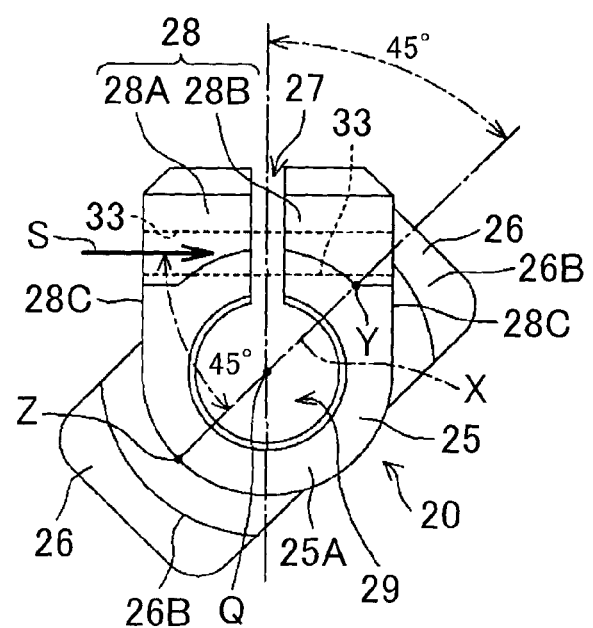
FIG. 7 is a side view of each yoke according to the second embodiment when viewed in a direction different from that of FIG. 6.
Figure 8:
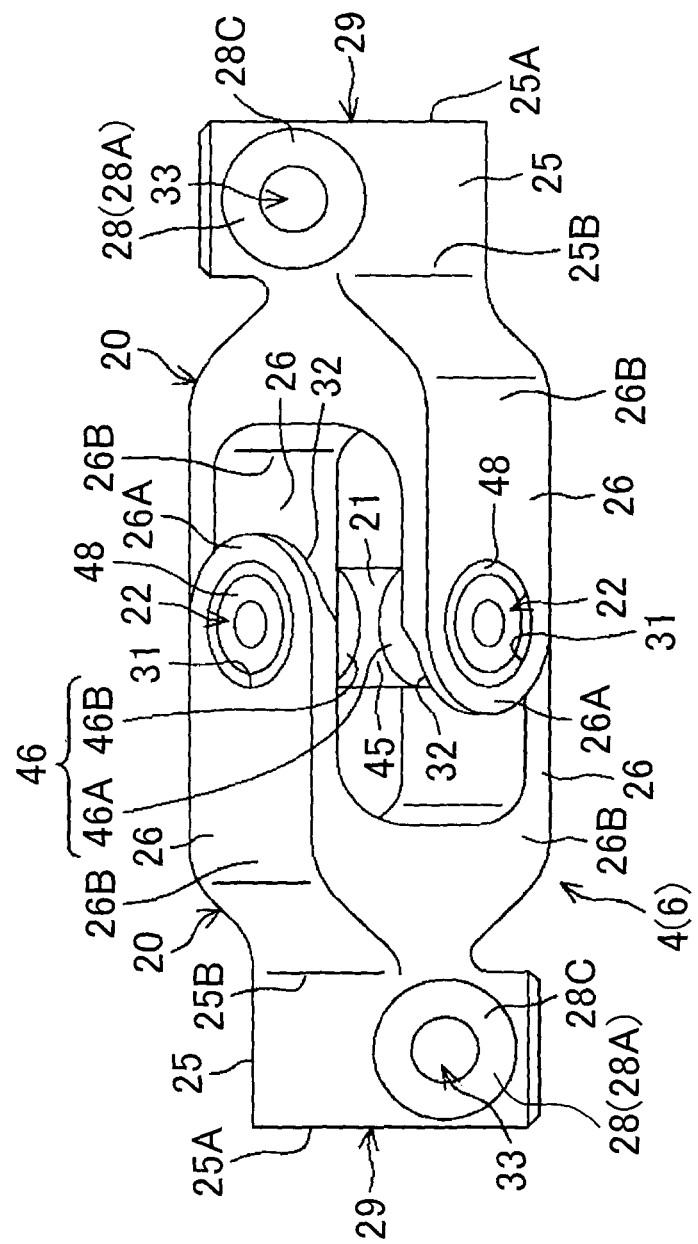
FIG. 8 is a side view of a universal joint according to the second embodiment.

In each of the yokes 20 according to the above-described first embodiment, the rib portion 30 is integrally formed at the other end 25B of the proximal portion 25 (see FIG. 2 to FIG. 4); instead, as shown in FIG. 6 and FIG. 7, the rib portion 30 may be omitted. Other than that, there is no difference between the above-described first embodiment and a second embodiment. As shown in FIG. 8, in a universal joint 4 (6) that is formed of the yokes 20 (see FIG. 6 and FIG. 7) according to the second embodiment, as in the case of the above-described first embodiment, the bolt insertion holes 33 of the flanges 28A of the respective yokes 20 face the same side (the front side of the sheet in FIG. 8).

The steering system 1 may have such a configuration that not the intermediate shaft 5 but the pinion shaft 7 is assembled to the insertion hole 29 of one of the yokes 20. The above-described yoke 20 and the universal joint 4 (6) are not limited to the steering system 1. The above-described yoke 20 and the universal joint 4 (6) are also applicable to any device that couples two shafts that are not aligned along the same straight line.

While the exemplary embodiments have been described, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less, or only a single element, are also within the spirit and scope of the invention.

The invention claimed is:

1. A yoke integrally comprising:
a proximal portion;
a pair of arm portions that extend from the proximal portion, the pair of arm portions being used for mounting a joint cross;
a rib portion that projects from the proximal portion toward bases of the pair of arm portions; and
a pair of flanges, wherein
a base adjacent to the rib portion is thick so as to rise toward the counterpart arm portion, the proximal portion has an insertion hole for mounting a shaft, a slit formed along the insertion hole and a bolt insertion hole for fastening the slit, a positional relationship between the proximal portion and the pair of arm portions is set such that a line segment that connects the pair of arm portions to each other and an insertion direction in which a bolt is inserted in the bolt insertion hole intersect with each other at 45°.

2. A universal joint comprising:
a pair of yokes; and
a joint cross that couples the pair of yokes such that the pair of yokes are relatively displaceable, wherein
the pair of yokes have mutually identical shapes,
each of the yokes integrally has a proximal portion, a pair of arm portions, a rib portion and a pair of flanges, each of the arm portions extends from the proximal portion, the joint cross is mounted to the arm portions, the rib portion projects from the proximal portion toward bases of the pair of arm portions, a base adjacent to the rib portion is thick so as to rise toward the counterpart arm portion, the proximal portion has an insertion hole for mounting a shaft, a slit formed along the insertion hole and a bolt insertion hole for fastening the slit, a positional relationship between the proximal portion and the pair of arm portions is set such that a line segment that connects the pair of arm portions to each other and an insertion direction in which a bolt is inserted in the bolt insertion hole intersect with each other at 45°, and
in a state where the pair of yokes are coupled by the joint cross, the bolt insertion holes of the pair of yokes face the same side.

* * * * *